UNITED STATES PATENT OFFICE.

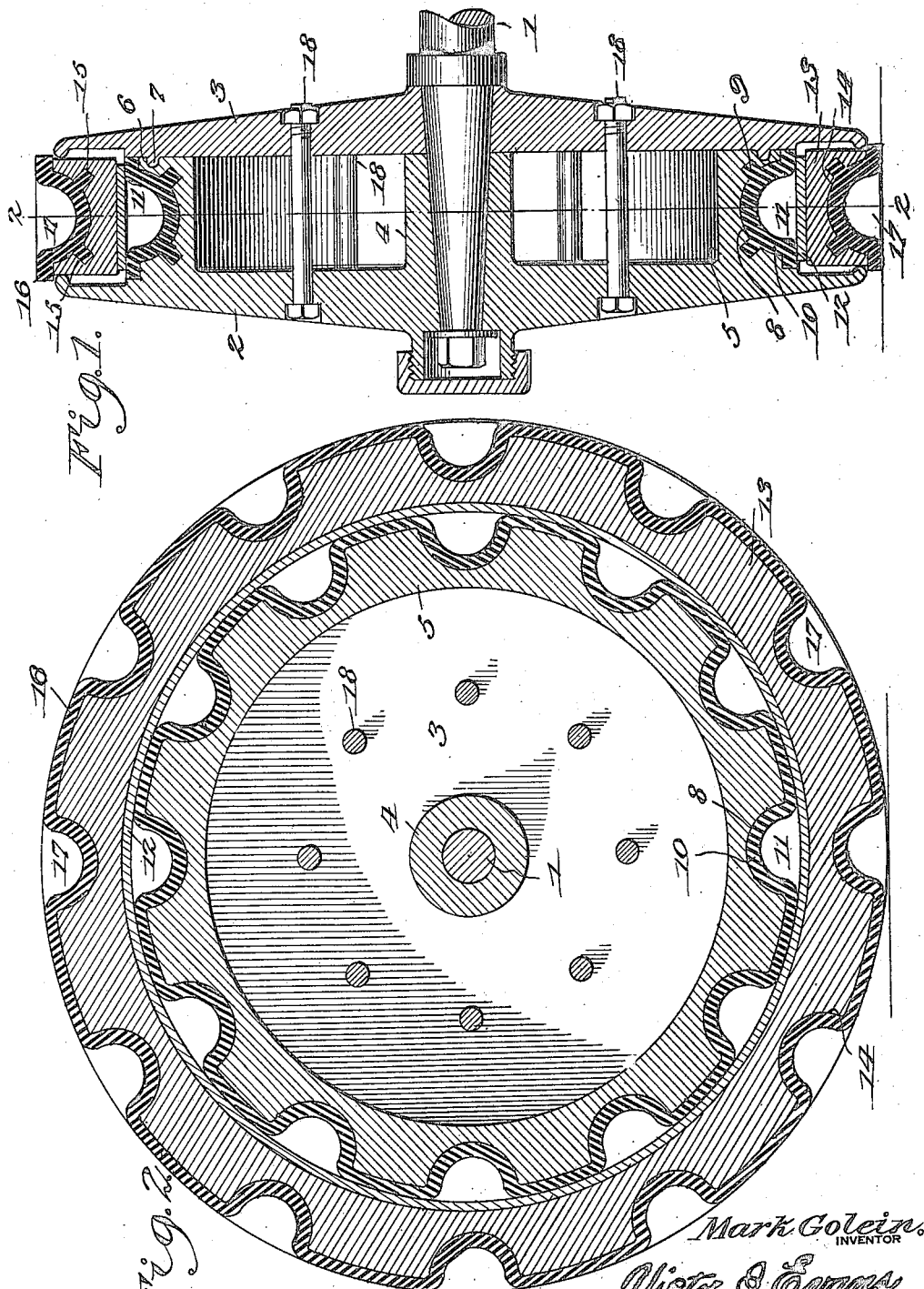

MARK GOLEIN, OF BROOKLYN, NEW YORK.

COMBINATION TIRE AND WHEEL.

1,403,115.  Specification of Letters Patent.  Patented Jan. 10, 1922.

Application filed May 7, 1920. Serial No. 379,591.

*To all whom it may concern:*

Be it known that I, MARK GOLEIN, a citizen of the United States, residing at Brooklyn, in the county of Kings and State of New York, have invented new and useful Improvements in Combination Tires and Wheels, of which the following is a specification.

This invention relates to combination tires and wheels for automobiles and other vehicles and one of the principal objects is to provide a wheel with resilient means having air pockets for cushioning purposes.

Another object is to provide the wheel with two similar members, one of which is for cushioning and the other of which is for preventing skidding by suction cups.

Another object is to provide a device of this kind in which when the parts wear they may be re-surfaced without loss or waste of any of the old material in the parts.

Other objects will appear from the following description and appended claims.

I attain all of these objects by means of mechanism shown in the accompanying drawing consisting of one sheet, in which:—

Figure 1 is a vertical sectional view of my improved combination tire and wheel taken substantially in the line of its axis.

Figure 2 is a vertical sectional view of the same taken substantially in line 2—2, Figure 1.

Like characters of reference refer to like parts in both views.

This invention contemplates the provision of a spokeless wheel having two annular rims one inside the other and both having facings made of rubber or other resilient material and having air pockets formed in them, the air pockets in the inner rim forming cushions and those of the outer rim forming anti-skid suction cups or tread.

Referring more particularly to the drawings, 1 represents the spindle of an automobile or other devices to which the wheel is to be attached, and 2 and 3 the outer and inner sections, respectively, of the body of the wheel, which sections are mounted on spindle 1. The outer wheel section 2 is provided with hub portion 4 and an annular flange 5, having an annular groove 7 formed in its inner face. The inner wheel section 3 is provided with an annular rib 7 which is adapted to be seated in the groove 6.

The curved face of flange 5 is grooved out so as to form a plurality of curved or semi-spherical depressions or seats having angularly disposed anchorage sockets 9. Into this curve depression is molded a coating 10 of rubber or like resilient material which seats itself by filling up the anchorage sockets and which is molded so as to form air pockets 11. About the outside of the member 10 is placed a band 12 of rubber or the like.

The annular band of metal 13 is placed outside member 12 and is formed with curved or semi-spherical depressions 14, and anchorage sockets 15 similar to elements 8 and 9 above described, and provided with a coating 16 which is molded similarly to member 10 to fill the anchorage sockets 15 and to form pockets 17.

In assembling the parts, the structure may be held together by bolts 18 or any other suitable means.

The operation of the above described mechanism is as follows:—

When the vehicle is running along the vibration and shock will to some extent be taken up by members 16 and 17, but mostly by member 10 which not only is resilient in material but contains a certain amount of air in the pockets 11, which pockets are rendered air tight by having band 12 pressed against them, and these pockets act as air cushions. It is obvious that the cups or pockets 17 will act as suction cups or anti-skid tread for the wheel.

When either of the members 10 or 18 becomes worn it is not necessary to replace the entire member, but the wheel may be placed in a mold and the worn part re-surfaced resulting in a great saving of material.

While I have described what I deem to be the most desirable embodiment of my invention, it is obvious that many of the details may be varied without in any way departing from the spirit of my invention; and I do not limit myself to the exact details of construction herein set forth nor to anything less than the whole of my invention limited only by the appended claims, and I reserve the right to apply the same principle of construction to other devices.

Now having described my invention what I claim as new and desire to secure by Letters-Patent is:—

1. In a device of the class described, the combination of an outer body section, an inner body section, one of said sections having a grooved flange provided with anchorage sockets, a resilient surface molded into said flange, and an outer tire supported by said resilient surface and confined between said body sections.

2. In a device of the class described, the combination of a body portion comprising a flange, a resilient member anchored to said flange and provided with air cups, a sealing band arranged to co-act with said member for sealing said cups, and means exterior of said band and adapted to press the same into sealing engagement with said cups, as and for the purpose set forth.

3. A wheel comprising two circular frame sections, one of said sections being provided with an outstanding annular flange formed with a plurality of curvilinear cups and a plurality of anchorage sockets radiating from said cups, a layer of resilient surfacing applied to said flange and anchored in said sockets, and tread means adapted to effect sealing of said cups as and for the purpose set forth.

In testimony whereof I have affixed my signature.

MARK GOLEIN.